US007887406B2

(12) United States Patent
Odom et al.

(10) Patent No.: US 7,887,406 B2
(45) Date of Patent: Feb. 15, 2011

(54) METHOD OF LOTTERY WAGERING ON A REAL WORLD PHASED COMPETITION

(76) Inventors: James M. Odom, 48 Rim Rd., Arroyo Seco, NM (US) 87514; Scott D. Yelich, 250 W. 50$^{th}$ St., Apt. 11P, New York, NY (US) 10019

(*) Notice: Subject to any disclaimer, the term of this patent is extended or adjusted under 35 U.S.C. 154(b) by 0 days.

(21) Appl. No.: 12/705,375

(22) Filed: Feb. 12, 2010

(65) Prior Publication Data

US 2010/0248805 A1 Sep. 30, 2010

Related U.S. Application Data

(63) Continuation of application No. 10/606,100, filed on Jun. 25, 2003, now Pat. No. 7,674,170.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .............................. 463/17; 463/13; 463/19; 463/21

(58) Field of Classification Search .................. 463/13, 463/17, 19, 21
See application file for complete search history.

(56) References Cited

U.S. PATENT DOCUMENTS

| | | | | |
|---|---|---|---|---|
| 4,583,736 | A | 4/1986 | Lorraine | |
| 4,796,890 | A | 1/1989 | Snyder | |
| 4,962,950 | A * | 10/1990 | Champion | 283/67 |
| 5,332,216 | A | 7/1994 | Whipple | |
| 5,518,239 | A | 5/1996 | Johnston | |
| 5,613,679 | A | 3/1997 | Casa et al. | |
| 5,722,890 | A | 3/1998 | Libby et al. | |
| 5,888,136 | A | 3/1999 | Herbert | |
| 6,004,206 | A | 12/1999 | Fabri | |
| 6,015,345 | A | 1/2000 | Kail | |
| 6,280,324 | B1 | 8/2001 | Tenenbaum | |
| 6,527,270 | B2 | 3/2003 | Maksymec et al. | |
| 6,786,824 | B2 | 9/2004 | Cannon | |
| 6,910,965 | B2 | 6/2005 | Downes | |
| 2002/0155873 | A1* | 10/2002 | Berman et al. | 463/16 |
| 2004/0029627 | A1* | 2/2004 | Hannan et al. | 463/1 |
| 2004/0043810 | A1 | 3/2004 | Perlin et al. | |
| 2004/0048656 | A1 | 3/2004 | Krynicky | |
| 2004/0210507 | A1* | 10/2004 | Asher et al. | 705/37 |

* cited by examiner

*Primary Examiner*—David L Lewis
*Assistant Examiner*—Adetokunbo Torimiro
(74) *Attorney, Agent, or Firm*—Scheinberg & Griner, LLP; Michael O. Scheinberg; John Kelly

(57) ABSTRACT

A method for lottery wagering on actual events. The method according to the present invention includes selecting a subset of wagering data $D_W$ from a set of pre-qualifying data $D_{PQ}$ prior to, conclusion of a pre-qualifying event of a phased competition consisting of a pre-qualifying event and a final event. The method further includes assembling pre-qualifying data $D_{PQ}$ for preliminary participants after conclusion of a pre-qualifying event and assembling concluding data $D_C$ for final participants after conclusion of the final event. Winners are selected from the final participants after the final event based on the concluding data. Winning lottery data $D_L$ is determined from a correlation between the winners' and their respective pre-qualifying data.

11 Claims, 3 Drawing Sheets

METHOD OF LOTTERY WAGERING ON A REAL WORLD PHASED COMPETITION

This application is a continuation application of U.S. patent application Ser. No. 10/606,100, filed on Jun. 25, 2003, which is hereby incorporated by reference.

FIELD OF THE INVENTION

The present invention pertains generally to the field of wagering systems. More particularly, the new and useful invention claimed in this document pertains to a method for wagering on an actual event or competition. The present invention is particularly, but not exclusively, useful for awarding a prize to one or more players choosing to place one or more wagers on vehicular racing, particularly through a lottery system or network.

BACKGROUND OF THE INVENTION

Within the United States, many states have enacted legislation to permit lotteries. Lotteries include a variety of games that, for a while, were popular and successful. A lottery is recognized as a form of gambling or gaming, allowing players to wager on the chance to win a valuable prize. In a typical lottery, players buy tickets with a series of characters or numbers from authorized vendors at fixed prices. Neither the characters nor numbers on the tickets generate inherent excitement. At a subsequent drawing, winning characters or numbers are selected on an unpredictable and random basis for comparison with the players' characters and numbers. Players who satisfy the requisite matching of characters or numbers win prizes.

In the familiar and typical lottery process, a computer generates a randomized prize data stream which includes a limited number of win/lose outcomes. Each outcome is assigned to a lottery ticket, and each ticket contains one or more game chances, which yield the assigned outcome. A player cannot change the ticket outcome. A player merely scratches off certain areas of the ticket in accordance with rules of the game to reveal the outcome, or waits until the computer-generated outcome is announced at some future date. Typically, a player purchases a lottery ticket located in stores that have apparatus for entering the choices of a player. The apparatus is generally in electronic communication with a central computer. A player may mark the characters or numbers he wishes to enter as the players' choices on a computer-scannable or computer-readable entry form. The player pays a fee, a clerk inserts the ticket into the apparatus, and the information is recorded in the central computer. After wagering has been closed, a variety of methods are used to determine the winning range of numbers or characters: bouncing balls with numbers written on the balls, and computer driven selection processes, are the most common.

Limitations on the current lottery approaches have become evident.

Lottery systems currently in effect generate no inherent enthusiasm by or on the part of the players. Lottery outcomes are not decided by real-world events, but rather by sterile computer programs, or by a tub of ping-pong balls. There is nothing for a player to watch or cheer for. Accordingly, many state-operated lotteries have reached market saturation, if not stagnation.

The real world presents a wide range of events that enthusiasts would like to wager on. A non-exclusive listing of such real-world events include political elections, racing events such as automobile races, motorcycle races, horse races, and similar events, as well as a wide range of sporting events. Given the fascination of the American public for theater and movies, even the Academy Awards® and the Oscar® presentations present an opportunity for wagering. Real-world events add drama and interest not achieved through typical lottery systems or networks.

Current lotteries fail to attract enthusiasts for the frequent and highly publicized events in the sporting world, the political world, or the world in general. A large, extant, already existing but untapped audience base exists for a number of sporting events, including as a non-exclusive example, automobile racing. National and worldwide media coverage is provided for such events. Thus, the NASCAR® Winston Cup Series is a racing model that holds great potential as a venue for a more modern wagering process through a lottery system.

Enthusiasts would become players in a lottery because they are dramatically interested in the' real world outcomes of events of interest to them. For example, the NASCAR® Winston Cup Series begins in mid-February with the Daytona 500 Race, and continues almost every weekend until thirty-six or more races are completed throughout the United States. The interest among consumers in NASCAR® racing is evident by the extent to which major corporations sponsor race teams and the racing events. In a typical NASCAR® race, each race week begins with one or two days of timed laps that are conducted until the fastest 43 cars qualify for the actual or subsequent 25 race. Qualifying laps end about forty-eight hours before the actual race. The result is a major sporting spectacle, frequently featuring 150,000 people in attendance, while perhaps five million households watch on television, and millions worldwide listen on radio. Significantly, NASCAR® features more: corporate sponsors among the Fortune 500 companies than any other sport. Fan support among those interested in NASCAR® racing is legendary. Presently, NASCAR® boasts forty million fans. The NASCAR® Winston Cup Series is the second highest rated regular season sport on television.

Lotteries following the conventional dreary mode of wagering are losing the hoped-for income generating status that state governments anticipated. As excitement has waned, lottery 5 income has decreased. Competition for entertainment and gaming dollars is on the increase. Lottery players are older, and lotteries are not attracting younger players. On the other hand, using just one of the competitions for which the present invention is useful, NASCAR® demographics indicate that 32% of NASCAR® fans are 18-34 years of age, and 26% are between 35-44 years of age. Brand loyalty among those fans is intense. These demographics, statistics and real-world facts suggest a way to use the present invention to breathe new life and entertainment into lotteries in participating states.

As indicated, a previously unaddressed need exists in the industry for a new, useful and improved method for conducting wagers through a lottery system that is capable of rejuvenating enthusiasm for lotteries in general. Particularly, there is a significant need for a method and 15 system that allows enthusiasts for one or more competitions to become lottery players who wager on real-world or actual events and competitions. The present invention for a method for lottery wagering on actual events addresses these needs, and is useful for providing a relevant and entertaining form of wagering, whereby the player can incorporate his or her insight, knowledge, experience and interest into the gaming activity.

The advantages, objects and features of the present invention for such a method and system will become apparent to those skilled in the art when read in conjunction with the following description, drawing figures and appended claims.

SUMMARY OF THE INVENTION

Given the conventional solutions for attempting to solve the problems associated with lotteries, it would be desirable, and of considerable advantage, to provide a method for conducting wagers through a lottery that involved real-world events.

The present invention provides numerous advantages in connection with a method for conducting wagers through a lottery. At least one of the advantages of the present invention is that the results are based on real-world, actual events.

Another advantage of the present invention is that it allows an enthusiast who wants to become a player in connection with a given competition to select a range of numbers or characters, or have the lottery system randomly choose a range of numbers or characters.

Yet another advantage of the present invention is that it allows wagers to be placed on pre-qualifying events that are conducted prior to a final event.

Still another advantage of the present invention is that it provides for identifying rankings or preliminary rankings as a predicate to conducting a final event. The rankings or preliminary rankings may be assembled into data in the form of pre-qualifying data.

A primary object of the invention is to provide a lottery system that enables results to be rendered on any number of media display devices, preferably in real-time, where one or more prizes may be awarded either at a retailer in the same manner, and with the same convenience, as current scratch-off lottery paper tickets, or electronically.

It is yet another object and advantage of the present invention to enhance current lottery systems by increasing sales and profits, and providing players with more competitive entertainment alternatives.

It is still another object and advantage of the present invention to provide a wagering system in which any number of competitions may be offered for purposes of wagering.

Yet another object and advantage of the present invention is that it builds on already extant player enthusiasm for a given or particular competition.

Still another advantage of the present invention is a method for conducting wagers through a lottery that is easy to use and to practice, and is cost effective for the intended purposes.

These objects and advantages are achieved in the present invention by providing a method for lottery wagering on actual events. The method according to the present invention includes assembling pre-qualifying data, $D_{PQ}$, for preliminary participants after conclusion of a pre-qualifying event of a phased competition, and assembling concluding data, $D_C$, for final participants after conclusion of a final event of a phased competition. A winner or winners of the final event are determined after the final event based on the concluding data $D_C$. The winners' concluding data is then correlated-to the winners' pre-qualifying data $D_{PQ}$. The winning lottery data, $D_L$, is determined from the correlation step.

Assembling the pre-qualifying data $D_{PQ}$ for preliminary participants can consist of assembling the preliminary participants' preliminary ranking data and may comprise collecting, collating, correlating, or mathematically manipulating the preliminary ranking data. Assembling the concluding data $D_C$ for final participants can consist of assembling the final participants' concluding ranking data, which may comprise collecting, collating, correlating, or mathematically manipulating the concluding ranking data.

Wagering data, $D_W$, is selected as a subset from the set of pre-qualifying data $D_{PQ}$ prior to conclusion of a pre-qualifying event. For example, if the pre-qualifying data consists of a set of numbers, then the wagering data may consist of a subset of n numbers selected from that group of numbers. The number of winners chosen from the final event would then be equal to n, and the n winners' respective pre-qualifying numbers would make up the set of n winning lottery numbers, $D_L$.

Players of the lottery of the present invention communicate with a lottery distributor who operates the lottery. A communication link between the distributor and player is used for communications. The communication link between the distributor and player can be a ticket, telephone link, radio frequency link, computer network, Internet, or World Wide Web communication link. This communication link is either encrypted or otherwise secured.

Optionally the present invention further includes the selection of a subset of wagering data from a set of concluding data. For example, in addition to selecting pre-qualification numbers as the wagering data, the player optionally selects an additional number representing some form of concluding data, such as the winner of a race. The winning lottery data is then comprised of a combination of the pre-qualification data and concluding data.

Wagering data is either selected manually by the player or randomly by the distributor for the player, where the distributor is the house, bank or other entity operating the lottery. Random selection of wagering data is accomplished mechanically or by computer and associated software means. The random wagering data is optionally provided to the player on a conventional "scratch-off" type ticket.

At the conclusion of the final event, wagering data $D_W$ is compared to the winning lottery data $D_L$, and prizes are awarded to successful lottery players.

Optionally, the present invention provides a second lottery phase for unsuccessful players. In the second lottery phase, the unsuccessful player enters the original wagering data $D_W$ to the lottery distributor, along with the player's account information, and the distributor randomly selects a winner or winners from the entrants. Prizes, preferably in the form of merchandise, are awarded to winners of the second lottery phase.

Optionally, the method of the present invention includes "real-time" trading of wagering data prior to the conclusion of the final event. Players designated real-time players may trade and revise wagers prior to the conclusion of the final event.

In an alternative embodiment of the invention, the pre-qualifying data is randomly shuffled by the distributor and assigned to the final participants. In this embodiment, winners of the final event are chosen based on the concluding data. Correlation of the winners' to their respective shuffled pre-qualifying data, $D_{PQS}$, is then performed to determine the winning lottery data, $D_L$. The winning lottery data, $D_L$, consists of the winners' $D_{PQS}$.

The present invention is further a method of lottery wagering on a phased vehicle race competition having a pre-qualifying event phase, race starting position data, and a final race phase. The method comprises selecting n numbers from a set of race starting position numbers as wagering numbers, prior to conclusion of the pre-qualifying event. The starting position numbers for each final race participant are determined after the pre-qualifying event. Then, n race winners are chosen after the final race phase based upon their concluding race data. The lottery winning numbers consist of the n race winners' n starting position numbers.

The invention is also a method of lottery wagering on a phased competition which includes selecting a subset of wagering data $D_W$ from a set of pre-qualifying data $D_{PQ}$ prior to conclusion of a pre-qualifying event by communicating with a lottery distributor over a communication link, such as by ticket, landline telephone, radio frequency, computer network, Internet, or World Wide Web connection. Additionally, the method includes assembling pre-qualifying data $D_{PQ}$ for preliminary participants after conclusion of a pre-qualifying event of a phased competition, assembling concluding data $D_C$ for final participants after conclusion of a final event of a phased competition, determining at least one winner of the final event based on the concluding data $D_C$, and correlating the concluding data $D_C$ of a winner to the pre-qualifying data $D_{PQ}$ of the winner. Winning lottery data $D_L$ is based on the correlating step. Finally, lottery data is optionally communicated between a distributor and a central hub over a communication link such as a landline telephone, radio frequency link, computer network, Internet, or World Wide Web connection.

The present invention is still further a system for lottery wagering on a phased competition. The system comprises a distributor for operating the lottery and distributing lottery prizes and a communication link between the distributor and a lottery player. The distributor has a storage medium for storage of lottery related data, means for correlating phased competition concluding data to phased competition pre-qualifying data, and means for random generation of wagering data for players. Preferably, the distributor operates via a computer and associated software. The communication link between the distributor and player preferably comprises a ticket, telephone, radio frequency link such as through a mobile telephone, computer network, Internet, or World Wide Web.

The present invention is also a system for lottery wagering on a phased competition including a hub for sharing information amongst distributors. The distributor operates a lottery and distributes lottery prizes and includes a storage medium for storage of lottery related data, means for correlating phased competition concluding data to phased competition pre-qualifying data, and a communication link for communication between the distributor and a lottery player. Each distributor then communicates via a communication link with a central hub, where the hub operates as a super-distributor for coordinating information from multiple distributors. The hub consists of a programmable computer and memory suitable for managing data. The communication link between the hub and a distributor is a landline telephone, radio frequency link, computer network, Internet, or World Wide Web.

It will become apparent to one skilled in the art that the claimed subject matter as a whole, including the structure of the system, and the cooperation of the elements of the system, combine to result in a number of unexpected advantages and utilities. The advantages and objects of the present invention will become apparent to those skilled in the art when read in conjunction with the accompanying following description, drawing figures, and appended claims.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for the purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawings, considered in connection with the accompanying description of the drawings, in which similar reference characters refer to similar parts, and in which:

DESCRIPTION OF A PREFERRED EMBODIMENT

Figure 1:
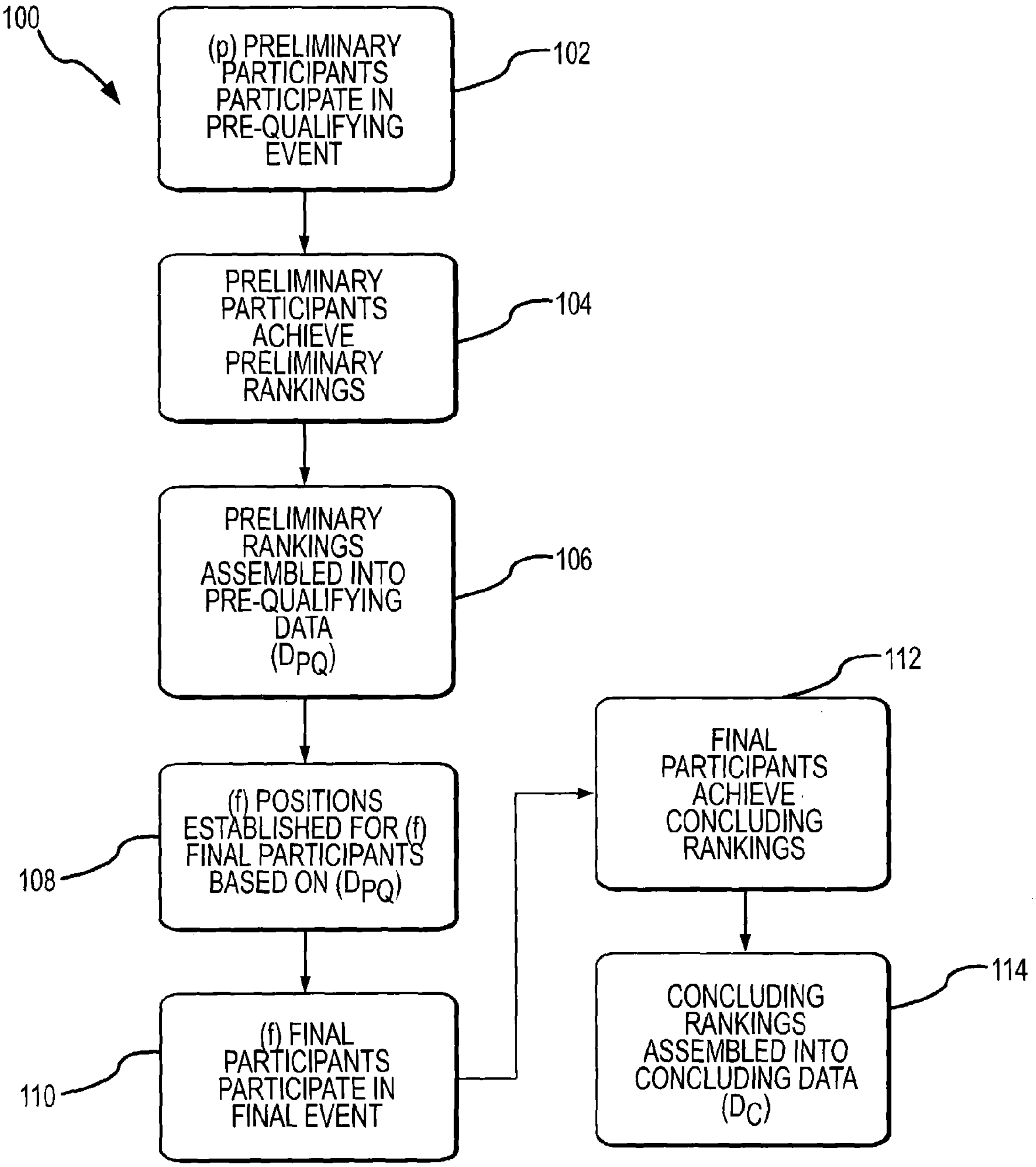
FIG. 1 is a flowchart depicting a phased competition applicable in accordance with the present invention for a method for lottery wagering on actual events.

Briefly, the present invention provides a method for lottery wagering based upon actual events. The method involves determining winning lottery data based on a correlation between winners of a final event and the pre-qualification data of those winners from a pre-qualifying event.

In this document, the term "event" refers to a contest, competition, performance, occurrence, or other event. The term "pre-qualifying event" refers to an event preceding a final event. During a pre-qualifying event, one or more persons, animals, machines, or other animate or inanimate actors or devices, either separately or in combination (individually, a "preliminary participant"), participate in an event. As a result of a pre-qualifying event, one or more preliminary participants may achieve or be assigned a range of positions, numbers, characters, results, arrangements, relative placements, situations, standings, or other rankings (individually, a "ranking") called a "preliminary ranking". The ranking or preliminary ranking may be collected; collated, correlated, or mathematically manipulated (collectively, "assembled") into data or results referred to as "pre-qualifying data."

A preliminary ranking or pre-qualifying data may establish for one or more preliminary participants a position, result, arrangement, relative placement, situation, standing, or other ranking (individually, a "position") for one or more final participants, formerly preliminary participants, at commencement of a subsequent event called, individually, a "final event". As a result of a final event, one or more participants may achieve or be assigned a range of positions, results, arrangements, relative placements, situations, standings, or other rankings (individually, a "concluding ranking") that may be assembled into data or results about the final event as "concluding data."

The step-by-step occurrences beginning with a pre-qualifying event, and ending with a final event, collectively are described in this document as a "phased competition." A phased competition may consist of a single event having two or more phases, or a series of related events, where an earlier event or events constitute the pre-qualifying event and a later event or events constitute the final event as might occur over the course of a season.

It will be apparent to those of skill in the art that the definitions of what constitutes the "pre-qualifying event," "final event," "pre-qualifying' data" and "concluding data" are limited only by the events surrounding, and the data generated by, any particular phased competition.

A preliminary ranking may be of interest to one or more persons (individually, an "enthusiast"). A preliminary ranking may be of interest to one or more persons who, or devices that, confirm and record a preliminary result or preliminary ranking (individually, a "comparator"). Likewise, a concluding ranking also may be of interest to one, or more enthusiasts and one or more comparators. An enthusiast may or may not witness a pre-qualifying event or a final event.

An enthusiast may elect to wager, and thus become a "player," in connection with any number of combinations and permutations of possible or probable occurrences (individually, a "possibility") in connection with a participant's pre-qualifying data or concluding data. A player may elect to place one or more wagers on one or more possibilities to occur, at any time before occurrence of a pre-qualifying event, and occurrence of a preliminary ranking. A player also may elect to place one or more wagers on one or more possibilities that may or may not occur, at any time before occurrence of a pre-qualifying event and occurrence of a final outcome. As will be evident to those skilled in the art, a player may elect to place one or more wagers on one or more possibilities that may or may not occur at any time in connection with a pre-qualifying event and a final event.

A player may elect to wager with any number of potential sources of distributors of winnings and prizes (individually, a "distributor") who operate a "lottery". A distributor may include as non-exclusive examples, a central bank or banker (a "house"), other players, or a state-operated system. A "hub" is a central administrator. Each distributor optionally communicates with the hub, and vice versa, so that information can be shared with the hub and with all other distributors. A "lottery" is a game, process or methodology whereby players place wagers on possibilities in hopes of receiving a prize at the conclusion of the lottery.

Communication between players and a distributor occurs via a "communication link." A communication link comprises either a hardwired or wireless communication link. A nonexclusive list of examples of communication links include: conventional landline telephone communication links, radio frequency (RF) communication links, and electronic communication links such as those implemented in computer networks. Where legally permissible, the distributor may operate via a network such as an Internet or World Wide Web (www) site.

The player interacts with the lottery distributor by data entry through a conventional keyboard, keypad or touch-screen, and/or verbally—in the instance where the communication link is a telephone, associated with the communication link. The player alternatively purchases a preprinted paper ticket, which the player saves until the conclusion of the final event. The distributor provides information to the player visually and/or aurally over conventional display and audio devices associated with the lottery communication link.

Data is stored, permanently or temporarily, as necessary by the distributor throughout the course of a lottery on a "storage medium," preferably in the form of a database. Storage mediums include, but are not limited to, hard and soft storage mediums such as paper mediums and computer readable mediums.

Winnings and prizes paid and distributed on successful wagers may be in the form of money, merchandise, script, vouchers, and other items of actual or perceived value (individually, a "prize"). As used in this document, a player who becomes eligible to receive a prize from a distributor is a "successful player." Successful wagers are announced via the communication link between the player and distributor, by radio, television, or other communication means.

Attention is now turned to the figures. A phased competition is depicted in FIG. 1 and is described here first to facilitate understanding of the present invention for a method for lottery wagering and its application to an' actual event. A discussion of the methodology of the invention follows with reference to FIGS. 2A and 2B. Further, to facilitate an understanding of the concepts, variables, and processes of the invention, an example of the invention applied to an actual phased competition, a NASCAR® race, is provided in parallel with a detailed explanation of the invention. The NASCAR® race example is presented herein only as one application of the methodology of the invention and is not to be construed as limiting the invention to any particular phased competition.

Referring to FIG. 1, a flowchart illustrating a phased competition having application in accordance with the present invention for lottery wagering on actual events is shown and generally designated 100. In a typical phased competition, such as the familiar NASCAR® race, the competition begins with a pre-qualifying event, in which a particular number (p) of preliminary participants participate, 102. In a NASCAR® race, the pre-qualifying event consists of a group of preliminary participants, typically p=50 race cars and associated drivers, who run qualifying laps to determine qualifying times for each car-driver combination. These qualifying times relate largely to the speed at which the car and driver are able to negotiate the racetrack.

Preliminary rankings 104 comprise data regarding, or related to, the performance of each preliminary participant. The next step in a typical phased competition is the assembly of prequalifying data, ($D_{PQ}$), from the preliminary rankings, 106. In the NASCAR® race example, pre-qualifying data may comprise a combination of speed and other performance data, or it may comprise speed data alone, from the pre-qualifying event.

Once the pre-qualifying data is assembled, positions are established for a predetermined number, (f) of final participants to participate in the final event, 108, where $f<p$. For example, in a NASCAR® race, forty-three (f) of the fifty (p) preliminary participants having the most favorable pre-qualifying data are chosen to participate in the final event. These f final participants are positioned in some manner for participation in the final event. In a NASCAR® event, the forty-three cars are positioned in a starting lineup according to their pre-qualifying data, such that the car having the most favorable pre-qualifying data has the most advantageous starting position for the race.

Next, the f final participants participate in the final event, 110. In the NASCAR® race example, the final event would be the actual race. Upon conclusion of the final event, each of the f final participants achieves a concluding ranking, 112. A concluding ranking of a NASCAR® race may consist for example, of any type of data regarding or related to the performance of each driver in the race. These concluding rankings are assembled into concluding data ($D_C$). For example, in a NASCAR® race, the concluding data may comprise an assembly of race-related data, or simply the place in which each race participant finished the race.

Figure 2A:
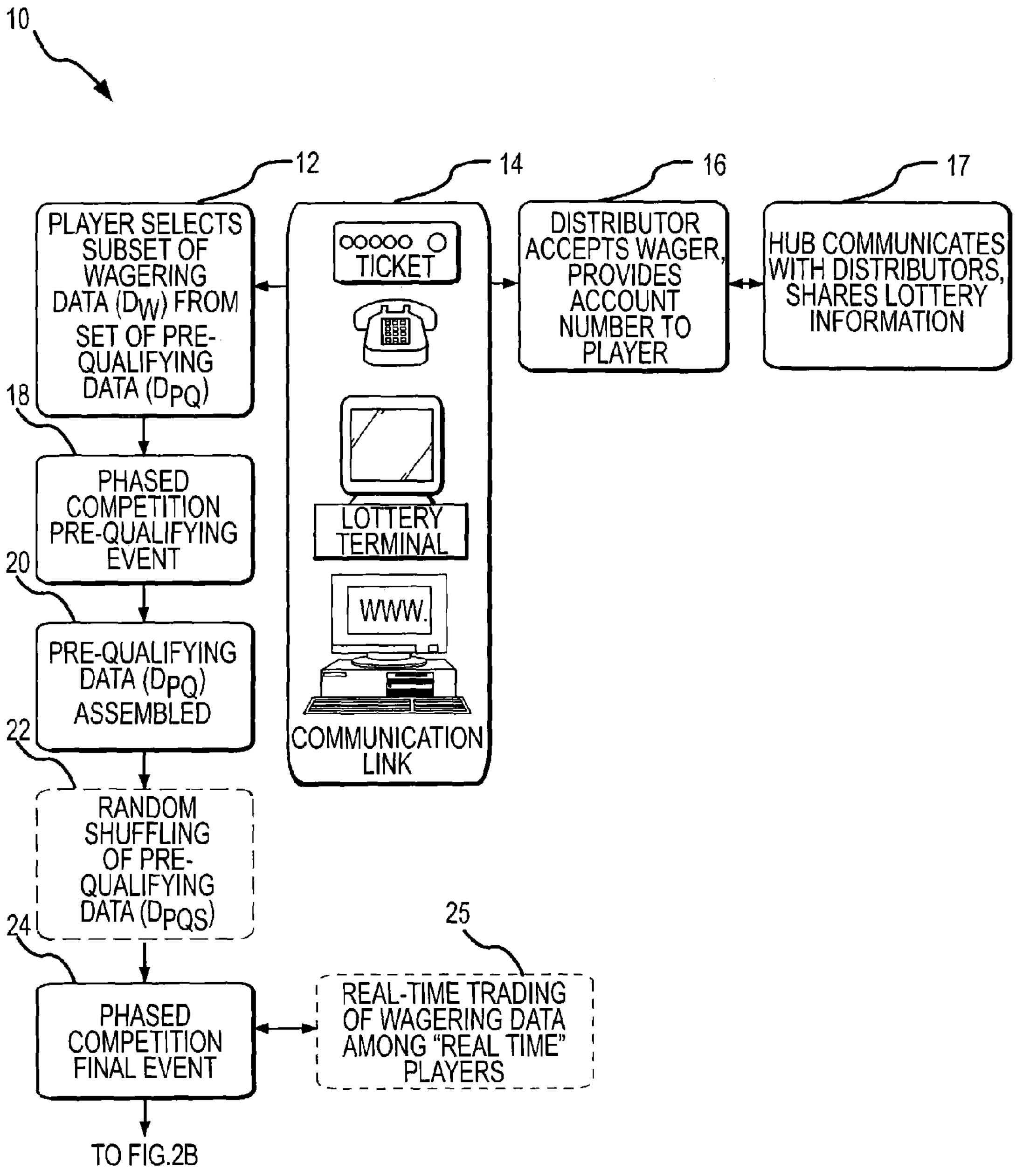
FIG. 2A is the first portion of a flowchart of a preferred embodiment of the present invention for a method for lottery wagering on actual events.
Figure 2B:
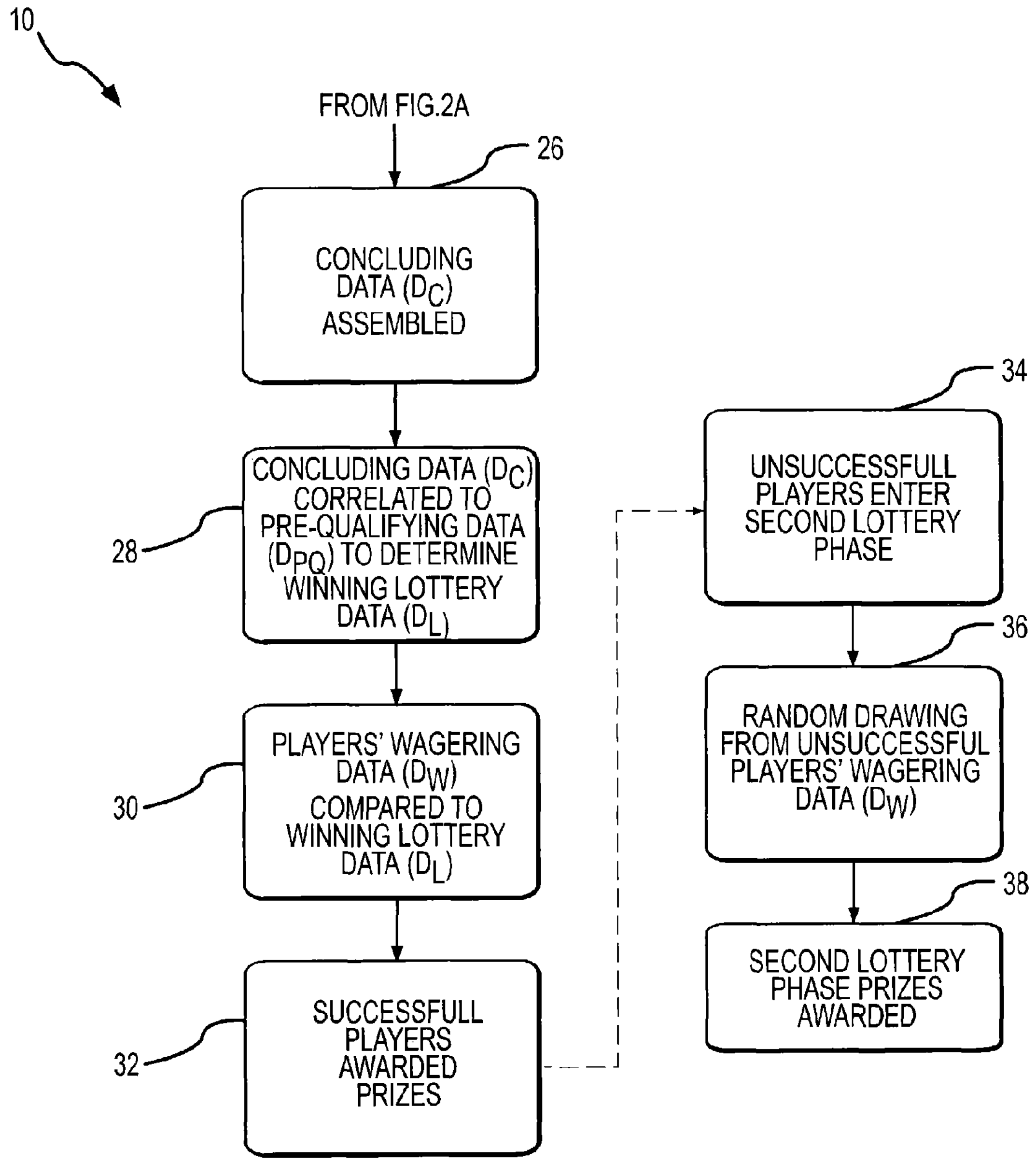
FIG. 2B is the second portion of the flowchart of FIG. 2A.

The present invention for a method for lottery wagering on actual events is now described as it is applied to a phased competition. Referring in combination to FIGS. 2A and 2B, a flowchart illustrating the methodology of the present invention is shown and generally designated 10. The method for lottery wagering on actual events begins with a player selecting a subset of, wagering data ($D_W$) from a set of pre-qualifying data ($D_{PQ}$) that will ultimately be assembled from rankings of a pre-qualifying event of a phased competition, 12. (See also FIG. 1.) The parameters for $D_W$, e.g., size and type of data, are predefined such that each player selects $D_W$ having the same parameters. The player is permitted to select $D_W$ during a predetermined time period preceding the pre-qualifying event of the phased competition.

Wagering data, $D_W$, is selected by the player via communication link 14 that is in communication with a distributor 16. The distributor 16 operates the lottery, including the associated data storage, random data generation, player account management, player interaction, winning lottery data determination, and award of prizes through a combination of suitable human resources, computer, software and data processing means.

Each distributor 16 optionally shares information with a central administrator, or hub 17. Each distributor 16 communicates with the hub 17, and vice versa, so that information can be shared with the hub and with all other distributors. Hub 17 consists of a programmable computer or other data processing and control mechanism, having suitable memory and data storage capacity. Communication between distributors and hub 17 occurs over a secure communication link, being encrypted or otherwise secured. The communication link is accomplished via landline telephone, radio frequency, computer network, Internet, World Wide Web, or other suitable communication means.

The selection of $D_W$ is performed either manually by the player or by random assignment by the lottery distributor. Random selection of $D_W$ is provided by computer in the circumstance where the distributor operates the lottery via computerized means, such as the Internet, World Wide Web, lottery terminals connected to a central computerized system, or other computerized system by a suitable software algorithm or algorithms. Alternatively, random selection of $D_W$ is provided by way of purchasing a paper ticket, such as the familiar "scratch-off" type lottery ticket, where $D_W$ is preprinted on the ticket as provided by a random number generation method. Each player's wagering data is stored on a storage medium associated with the lottery distributor 16.

In the NASCAR® race example, players select a subset of n numbers, where $n \geqq 1$ as predefined for the lottery—for example, n=5, from the set of pre-qualifying data $D_{PQ}$. In this example, the $D_{PQ}$ data are related to the starting lineup positions of the f, or 43, final participants in the final event, or race. Thus, $D_{PQ}$ are the numbers 1 through 43, and the player selects n of those numbers as the wagering data, $D_W$. As an example, a player may select, or be randomly assigned, the numbers 4, 17, 19, 37, and 40 as the wagering data, $D_W$.

A variation of the above NASCAR® race example allows players to select-as wagering data a subset of n numbers from the set of pre-qualifying data $D_{PQ}$, as well as m "favorite" participant(s) to win the final event, where $m \geqq 1$ as predefined for the lottery and is selected from concluding data. The winning lottery data is then a combination of the set of n winners' respective pre-qualifying data, $D_{PQ}$, and m concluding data, $D_C$.

After the predetermined time period for selecting $D_W$ has elapsed, the phased competition, pre-qualifying event occurs, 18. At the conclusion of the pre-qualifying event, pre-qualifying data, $D_{PQ}$, is assembled for each preliminary participant, 20. $D_{PQ}$ in the NASCAR® race example consists of the starting lineup position of each of the (f) participants chosen to participate in the final race event. Therefore, $D_{PQ}$ are the numbers 1 through 43, where number 1 is the most favorable starting lineup position, number 2 is the second most favorable starting lineup position, etc. The number 1 thus represents the car and driver who achieved the first starting lineup position, such as the car carrying decal number 89 driven by John Doe. Number 2 represents the car and driver who achieved the second lineup position, such as the car carrying decal number 77 driven by Jane Roe. This information is available to the public and any players of the lottery. $D_{PQ}$ is stored on a storage medium associated with the lottery distributor.

In an alternative embodiment of the invention, the pre-qualifying data, $D_{PQ}$, is randomly shuffled, 22, by a random shuffling mechanism which generates and stores on a storage medium an altered data set $D_{PQS}$. $D_{PQS}$ is stored on a storage medium associated with the lottery distributor. Random shuffling is accomplished mechanically or by computer means such as through implementation of a suitable software algorithm. A non-exclusive example of mechanical shuffling means includes the familiar lightweight balls having data printed on them that are projected about by air within a container then drawn from the container in a sequential fashion.

For example, in the NASCAR® race application, random shuffling, 22, of the prequalifying data $D_{PQ}$ is accomplished, either mechanically or by computer generation, as follows. The f final participants' race car decal numbers, e.g., car number 89 driven by John Doe, car number 77 driven by Jane Roe, are placed into the random shuffling mechanism. The random shuffling mechanism assigns a number, from the set 1 through 43, to each decal number. Hence, John Doe's car may be assigned 43, while Jane Roe's car is assigned 9, which has no relationship to the starting lineup position of each car-driver combination. However, only those f final participants, chosen according to their pre-qualifying data $D_{PQ}$, are placed into the random shuffling mechanism. The random assignment of the numbers 1 through 43 to each of the f final participants is made available to the public by announcement from the lottery distributor over a communication link, or other communication means.

Upon conclusion of the pre-qualifying event, 18, assembly of pre-qualifying data $D_{PQ}$, and optional assembly of shuffled pre-qualifying data, $D_{PQ}$, the final event takes place, 24. The final event in the example followed herein is the NASCAR® race.

At the conclusion of the final event, concluding data, $D_C$, is assembled from the rankings of the final participants in the final event, 26. Winners are chosen from the final participants. Concluding data, $D_C$, of the n winners of the final event is stored and correlated back to the winners' pre-qualifying data, $D_{PQ}$, or shuffled pre-qualifying data, $D_{PQS}$, depending upon which embodiment of the invention is implemented, 28. The pre-qualifying data of the final event winners comprises the winning lottery data, $D_L$, the set of n winning lottery numbers. Winning lottery data, $D_L$, is stored on a storage medium associated with the lottery distributor. Successful players are those whose wagering data $D_W$ matches that of $D_L$, 30.

In the NASCAR® race application, the concluding data comprises the finishing position of each car-driver combination. Presuming all 43 cars completed the race, the concluding data, $D_C$, are the 1 through 43 finishing positions of the f final race participants. This data is then correlated to the pre-qualifying data, $D_{PQ}$, or shuffled pre-qualifying data, $D_{PQS}$, depending upon which embodiment of the invention is implemented.

For example, in the non-shuffled embodiment of the invention, if Jane Roe, car decal number 77, won the race then her concluding data is finishing position number 1. This concluding data is correlated back to her starting lineup position, which was second (2). Therefore, one of the set of n winning lottery numbers, $D_L$, is "2". The top n, in this example 5, finishers of the race are used to determine the n winning lottery numbers, $D_L$, by correlating the 5 winners back to their pre-qualifying data and using that pre-qualifying data as the winning lottery data. However, any predefined concluding data $D_C$ can be used to select the n winning lottery numbers; for example, the top n drivers having the highest maximum speed during the race can be deemed the "winners" and correlated back to their pre-qualifying data to determine the winning lottery numbers.

In the shuffled embodiment of the invention, the concluding data, $D_C$, is correlated back to the shuffled pre-qualifying data, $D_{PQS}$. Continuing with the NASCAR® example where Jane Roe, car decal number 77 won the race, or achieved the highest of some other predefined race concluding data, her concluding data is number 1. This concluding data is correlated back to her shuffled pre-qualifying data, which was nine (9). Therefore, one of the set of n winning lottery numbers, $D_L$, is "9". The top n, in this example 5, "winners" of the race are used in determining the n winning lottery numbers, $D_L$.

nally unsuccessful players who entered this second phase, 36. Prizes are awarded to the second phase winners, preferably in the form of merchandise, 38.

Another optional feature of the present invention is the inclusion of "real-time" trading of Wagering data, $D_W$, among certain players designated as "real-time" players. In addition to selecting $D_W$ at the beginning of the lottery, certain players select the option to be "real-time" players with the distributor 16. Real-time players are provided the option of trading $D_W$ amongst themselves, revising their $D_W$ with the distributor, and placing wagers based on odds posted by the distributor, collectively referred to as "trading", 25. This activity proceeds from the time the wagering data is selected up until a predetermined time preceding the conclusion of the final event. Prizes awarded to real-time players are separate from those awarded to the remaining players.

Although the invention has been described with application to a NASCAR® competition, the invention has application to a variety of phased competitions, including but not limited to tennis, or other "seeded" competitions where individuals or teams are invited or positioned to participate in one or more competitions comprising a final event, based upon their pre-qualifying data, or "seed"; "ranked" competitions such as golf, college football or basketball; and nonathletic competitions such as the Oscar® awards where the final participants are "nominated". A non-exclusive list of example phased competitions are presented in Table 1 below:

TABLE 1

| Phased Competition | Pre-qualifying Event | Pre-qualifying Data ($D_{PQ}$) | Final Event | Example Concluding Data ($D_C$) |
|---|---|---|---|---|
| tennis tournament | performance in current year of play or season | seed | tournament | final position in tournament |
| golf tournament | performance in current year of play or season | rank | tournament | final position in tournament |
| Oscar ® awards | current year of movies | nomination | awards ceremony | best picture, best actor, best actress |
| auto race | time trials for race | starting position | race | final position-in race |

In either embodiment of the invention, successful players whose wagering data $D_W$ matches that of $D_L$ are awarded prizes, 32.

Certain optional features are implemented into the invention to add interest to the lottery method. One optional feature extends the lottery to allow unsuccessful players to enter a subsequent lottery for other prizes, preferably in the form of merchandise. Players who are unsuccessful in the original lottery phase enter into a second lottery phase, 34. In the second lottery phase, unsuccessful players enter their losing wagering data, $W_D$, through a communication link to a distributor, within a predetermined time period following the announcement of the winning lottery numbers, $D_L$ in the original lottery phase. In addition to entering their losing wagering data, the unsuccessful player also enters the account number provided to them by the distributor upon placement of the original wager into the lottery. No additional monetary payment or other consideration is required of the unsuccessful player in the second lottery phase. After the close of the time period allotted for entering the second lottery phase, the lottery distributor randomly selects winners from the originally unsuccessful players who entered this second phase, 36.

Also within the principles of the invention is the union of two or more phased competitions into a single lottery. A non-limiting example of such a union is a lottery whereby players select as wagering data, $D_W$, data from two phased competitions that take place relatively close in time. Winning lottery data, $D_L$; is then based on concluding data and correlation back to pre-qualifying data from each of the two competitions.

While the particular method for lottery wagering on actual events as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. A computer-implemented method of operating a lottery wagering system in which the winning lottery numbers are determined by the actual outcomes of one or more real world events, comprising:

accepting multiple wagers from wagerers, each wager including a group of picked numbers, the picked numbers being a subset of a set of available lottery numbers;

randomly associating possible outcomes of the one or more real world events with numbers in the set of available lottery numbers after accepting all the multiple wagers from the wagerers, so that the wagerers do not know which possible outcomes are associated with the picked numbers when they are picked;

after the one or more real world events are completed, determining the actual outcomes of the one or more real world events;

after the actual outcomes are determined, assigning as winning lottery numbers the random numbers from the set of lottery numbers associated with the actual outcomes of the real world event;

awarding a prize to a wagerer whose picked numbers correspond to the winning lottery numbers, the winning lottery numbers being determined from the outcomes of the one or more real world events, and the wagerer not knowing at the time his numbers are picked which numbers will be associated with which outcomes of the real world event so that the probability of a player winning the lottery is random.

2. The method of claim 1 in which accepting multiple wagers from wagerers includes accepting a wager including a group of picked numbers selected by a computer program or a group of picked numbers selected by a wagerer.

3. The method of claim 1 in which accepting multiple wagers from wagerers includes accepting at least some wagers over a communication link.

4. The method of claim 3 in which the communication link is selected from the group consisting of tickets, landline telephone, radio frequency, computer network, Internet, and World Wide Web.

5. The method of claim 1 further comprising after randomly associating the possible outcomes of the one or more real world events with numbers in the set of available lottery numbers and before determining the actual outcomes of the one or more real world events, providing wagerers the ability to trade wagers.

6. The method of claim 5 in which providing wagerers the ability to trade wagers includes providing wagerers the ability to trade wagers among themselves.

7. The method of claim 5 in which providing wagerers the ability to trade wagers includes providing wagerers the ability to trade wagers with the lottery operator based on odds provided by the lottery operator.

8. The method of claim 1 further comprising after randomly associating the possible outcomes of the one or more real world events with numbers in the set of available lottery numbers and before determining the actual outcomes of the one or more real world events, accepting revisions of the wagers.

9. The method of claim 1 further comprising randomly associating the possible outcomes of the one or more real world events with numbers in the set of available lottery numbers and before determining the actual outcomes of the one or more real world events, posting odds and allowing wagerers to place wagers.

10. Computer readable media including computer instructions for carrying out the steps of:

accepting multiple wagers from wagerers, each wager including a group of picked numbers, the picked numbers being a subset of a set of available lottery numbers;

randomly associating possible outcomes of the one or more real world events with numbers in the set of available lottery numbers after accepting all the multiple wagers from the wagerers, so that the wagerers do not know which possible outcomes are associated with the picked numbers when they are picked;

after the one or more real world events are completed, receiving the actual outcomes of the one or more real world events;

after the actual outcomes are received, assigning as winning lottery numbers the random numbers from the set of lottery numbers associated with the actual outcomes of the real world event;

awarding a prize to a wagerer whose picked numbers correspond to the winning lottery numbers, the winning lottery numbers being determined from the actual outcomes of the one or more real world events, and the wagerer not knowing at the time his numbers are picked which numbers will be associated with which outcomes of the real world event so that the probability of a player winning the lottery is random.

11. A lottery system, comprising:

a computer processing unit;

a computer memory storing computer instructions for carrying out the steps of:

accepting multiple wagers from wagerers, each wager including a group of picked numbers, the picked numbers being a subset of a set of available lottery numbers;

randomly associating possible outcomes of the one or more real world events with numbers in the set of available lottery numbers after accepting all the multiple wagers from the wagerers, so that the wagerers do not know which possible outcomes are associated with the picked numbers when they are picked;

after the one or more real world events are completed, receiving actual outcomes of the one or more real world events;

after the actual outcomes are received, assigning as winning lottery numbers the random numbers from the set of lottery numbers associated with the actual outcomes of the real world event;

awarding a prize to a wagerer whose picked numbers correspond to the winning lottery numbers, the winning lottery numbers being determined from the outcomes of the one or more real world events, and the wagerer not knowing at the time his numbers are picked which numbers will be associated with which outcomes of the real world event so that the probability of a player winning the lottery is random.

* * * * *